May 10, 1966 M. T. DAJANI 3,250,117
METHOD FOR DETERMINING PETROLEUM HYDROCARBON CHARACTERISTICS
Filed April 10, 1963 7 Sheets-Sheet 1

Inventor
Mahmoud Dajani
By Marzall, Johnston, Cook & Root
Attorneys

May 10, 1966 M. T. DAJANI 3,250,117
METHOD FOR DETERMINING PETROLEUM HYDROCARBON CHARACTERISTICS
Filed April 10, 1963 7 Sheets-Sheet 2
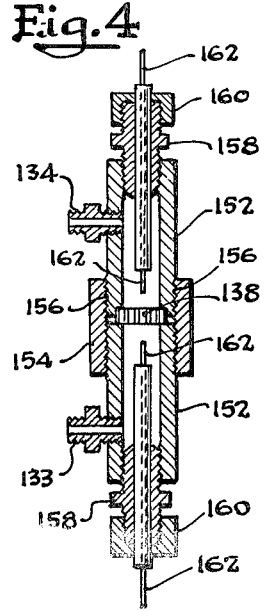
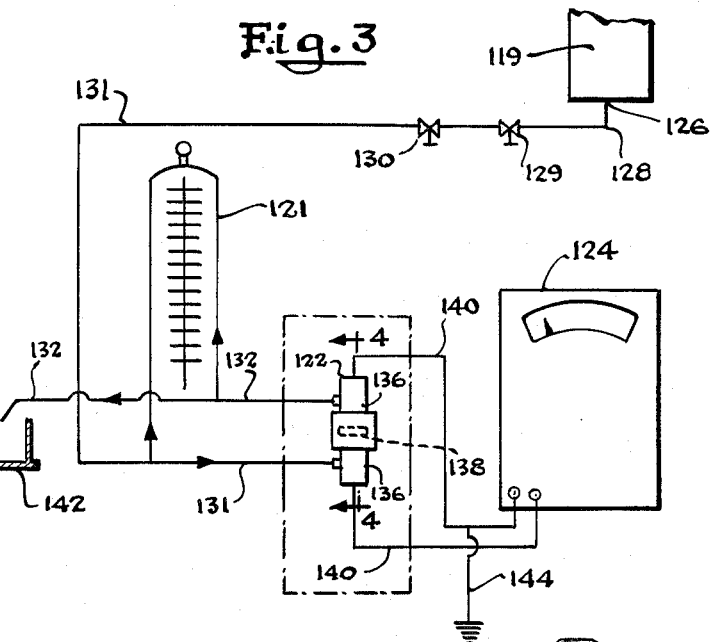
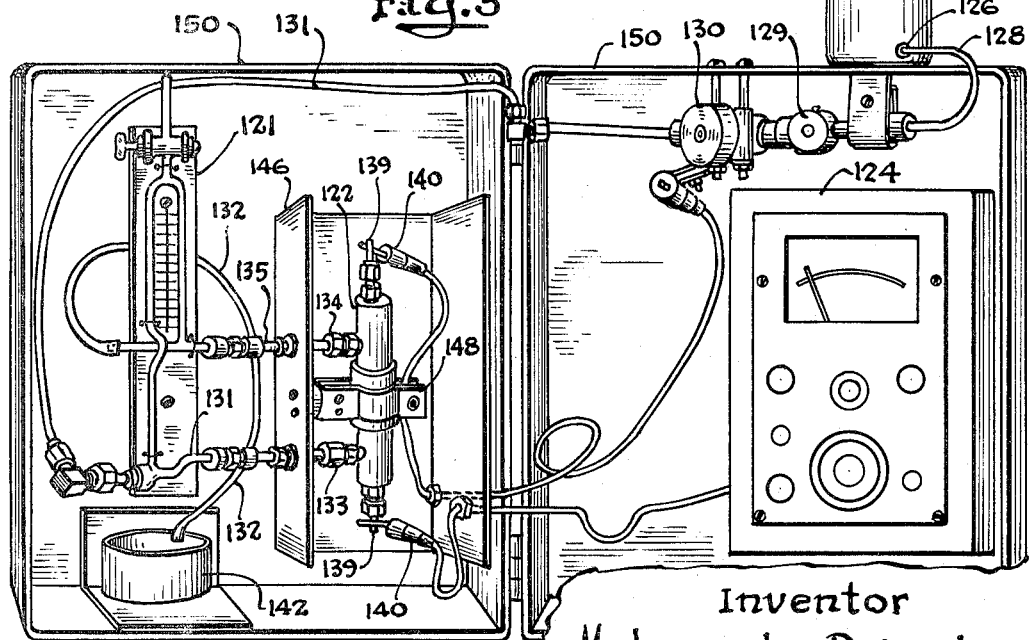
Inventor
Mahmoud Dajani
By Marzall, Johnston, Cook & Root
Attorneys

STREAMING CURRENT VS. VOLUMETRIC FLOW RATE OF FIVE SAMPLES OF CRACKED NAPTHA

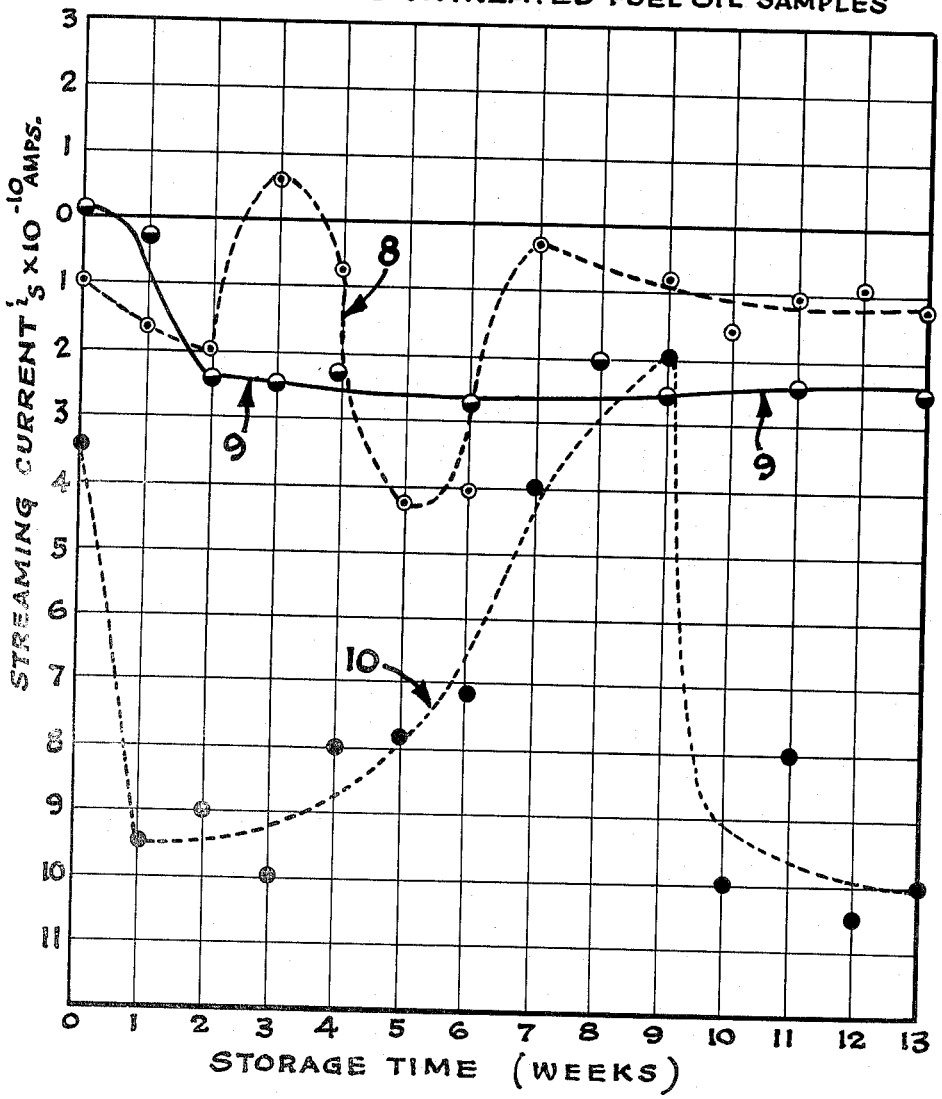

United States Patent Office 3,250,117
Patented May 10, 1966

3,250,117
METHOD FOR DETERMINING PETROLEUM
HYDROCARBON CHARACTERISTICS
Mahmoud T. Dajani, Park Forest, Ill., assignor to Nalco
Chemical Company, Chicago, Ill., a corporation of
Delaware
Filed Apr. 10, 1963, Ser. No. 271,962
22 Claims. (Cl. 73—53)

The instant invention is concerned with a method for determining chemical and physical characteristics of petroleum hydrocarbon fluids. More specifically, the invention is concerned with a means of determining fouling tendencies of petroleum hydrocarbon in intermediate distillates used as intermediary feed products in refinery processes, and a method of determining stability characteristics of finished refinery products. As an adjunct to the above, the invention is also concerned with a novel apparatus for measuring the above characteristics of petroleum fluids.

Problems of petroleum treatment are generally broken down into two broad classes. The first deals with treatment of finished petroleum products, that is, those which have been completely processed and are ready for storage and/or transportation to intended use. Here, it is essential that the product remain homogeneous and essentially in the same chemical and physical condition as refined. For best performance, whether the finished petroleum product be a gasoline or fuel oil, it is necessary that it be stabilized against formation of sludge bodies, foreign colored matter, undesirable polymerization products such as gums and agglomerates of other types. In order to achieve most efficient results in combustibility, fluidity, etc., it is generally necessary to inhibit finished petroleum products with chemical treating agents whereby impure sludge material and color bodies are not formed to any substantial degree, or if formed, are kept in a homogeneous state of dispersion throughout the body of the petroleum product. For example, it is known that some petroleum fuels such as gasoline have a tendency to deteriorate. This deterioration may be prevented by incorporating with such fuels minor amounts of chemical materials known as stabilizers or anti-oxidants. In particular, those gasolines which are produced through catalytic cracking processes of petroleum hydrocarbons tend to produce unstable products which form sludges or gums, which undesirable by-products also tend to discolor the gasolines under conditions of storage and use. Very frequently, chemicals must be added to retard the above effects.

Another specific problem relating to the stabilization of finished petroleum products relates to the stabilization of oils used as fuel materials, such as residual fuel oils and heavy blends. For example, heavy distillates known as No. 2 or 3 fuel oils are commonly used for home and industrial use. Likewise, even heavier non-distillate fuel oil fractions, designated commercially as Grade Nos. 4, 5, and 6 are used in large industrial furnaces and boilers. These oils have disadvantages in that deleterious deposits are formed which foul or plug screens or orifices of the burner equipment. Likewise, upon standing prior to use ofttimes a corrosive material is formed which attacks the metal surfaces of the lines, tanks, and burners. Particularly in the case of residual fuel oils, frequently sludges and gum residues are formed in storage tanks. These residues gradually build up and collect at the bottom of a tank and occupy valuable storage space which would be otherwise devoted to storage of suitable oils. Again, chemicals are generally added to these fuel oils in order to arrest build-up of tank bottom sludge and decrease the tendency of these oils toward burner fouling and plugging of screens and orifices.

Another major problem frequently exists in the refinery stream itself. Here, the petroleum fractions which are being processed are subjected to an entirely different environment and are under extremely different conditions of stress than are the subsequently formed petroleum products. Particularly, the petroleum intermediate distillates which are being processed into the desired tailor-made products, are subjected to extreme heats and pressures. Until recently, treatment of these intermediate or charge stocks used in production of finished petroleum products has been given relatively little attention. However, with the ever-increasing need for improved petroleum products such as higher octane gasolines, improved aviation fuels and improved residual fuels, the various refinery charge stocks themselves have been treated with chemical agents in order to improve their value when these charge stocks have been processed by relatively new techniques greatly improving their fuel values.

One of the worst problems encountered in the treatment of various petroleum charge stocks is the phenomenon which is now recognized and which is descriptively called fouling. The phenomenon manifests itself in the form of deposits which frequenly form on the metal surfaces of the processing equipment and tend to materially decrease the efficiency of the intermediate refining operations. The direct results of fouling appear in the forms of heat transfer loss, increased pressure drops, loss in through-put and, in some instances, a specific type of corrosion product which is associated with the deposits.

Charge stocks which most commonly cause fouling in the intermediate refinery equipment are naphthas, gas oils and crudes. The naphthas or light distillate stocks may be considered as a light oil, at least 10% of which boils below 347° F., and at least 95% distills below 464° F. The gas oils which frequently are referred to as middle distillates usually are intermediates between the so-called kerosene fractions and the light lubricating cuts. The gas oils are usually used as charges to cracking units where the molecules are broken down into smaller components. The crude oils which most commonly cause the problem of fouling are virgin products charged to the first refining stage operations and contain all of the petroleum fractions normally removed in the refining process.

The various charge stocks mentioned above are most frequently subjected to one or more of the following general type processes to produce fuels: reforming, cracking, alkylation, isomerization, polymerization, desulfurization, hydrogenation, and dehydrogenation. These processes may be performed using a number of specific refining techniques which frequently employ catalytic reagents.

As mentioned above, the deposits most frequently occur at elevated temperatures which range between 200° F. and 1100° F. The types of mechanical equipment most commonly affected are furnaces, pipes, heat exchangers, reboilers and condensers. The charge stock flows through these various types of heat processing equipment which for purposes of simplification are simply referred to as conductors.

The deposits forming on the metal surfaces thus described are varied in composition and may be either organic, inorganic, or mixed organic and inorganic, the latter type deposit being the most common type found in intermediate refining processes. The organic deposits are primarily polymerization products and are usually black, gummy masses which may be converted to coke-like masses at elevated temperatures. The inorganic portions of the deposits will frequently contain such components as silica, iron oxide, sulfur trioxide, iron sulfide, calcium oxide, magnesium oxide, inorganic chloride salts, sodium oxide, alumina, sodium sulfate, copper oxides and copper salts.

The problems described with reference to fouling are distinguishable from the discussed phenomena of corrosion and sludge formation frequently occurring in finished products. For example, sludge or deposit formation in finished products may be overcome by solubilization using organic solvents such as benzene, acetone, and the like. On the other hand, the fouling deposits are not readily solubilized by common organic solvents. Also the inorganic fouling deposit products are frequently much more complex in their make-up than the conventional corrosion products; hence they are also readily distinguishable on this basis. Known anti-oxidants or stabilizing chemicals in many instances cannot be used to mitigate the problem of fouling. Ofttimes conventional anti-oxidants and stabilizers are relatively ineffective as reagents to promote fouling decrease. Likewise, many chemical treating agents useful in preventing and/or dispersing already formed fouling deposits are not useful in inhibiting sludge and color bodies in finished petroleum products.

In order to determine the tendencies of intermediate and finished petroleum products toward fouling and instability respectively, it is necessary to first test the hydrocarbon fluid for such properties. Likewise, if serious problems exist in these areas, it is necessary to likewise test various samples containing proposed additives, and determine their effectiveness in arresting the various problems discussed above. Many tests have been devised to test both samples of untreated hydrocarbon fluids and samples containing proposed additives. Often, the hydrocarbon fluids are first treated with various levels of proposed chemical additives and stored at room temperature or higher. Over a period of many weeks the oils are visually observed at various intervals as to the amount of sludge formation. Likewise, NPA color determinations are made at the same intervals. Another test, generally involves filtering various aliquots of the stored sample and observing its color effect upon the filter pad by comparison to various standards. Likewise, the amount of sludge formed in the sample itself may be measured by known means.

The problems attendant to measurement of fouling tendencies of various intermediate petroleum stocks, and testing effectiveness of the various proposed additives upon such stocks are entirely different from those problems involving finished petroleum products, essentially concerned with storage phenomena. In particular, methods must be devised whereby the refinery stream conditions themselves are reproduced on a laboratory scale and samples of various intermediate stocks, when tested in such laboratory apparatuses, simulate refinery conditions to give meaningful results. Specifically, the laboratory apparatus so designed must evaluate the fouling tendencies of petroleum hydrocarbon fluids under conditions of heat and pressure which accurately simulate actual petroleum refinery conditions. As mentioned above, antifouling chemical additives can be formulated to prevent or alleviate the above-described problems of fouling. However, in order to investigate these various antifouling additives used in process streams to reduce the severe organic and inorganic fouling of refinery equipment, specific laboratory equipment must first be designed to give the respective additives a preliminary screening prior to field testing. The proposed additives cannot normally be first tested under direct refinery conditions without initial laboratory experimentation since such tests on a refinery production scale are very costly, and failures can cause disastrous damage to the point of economic hardship even to a larger refiner.

One particular prior art laboratory apparatus which has been designed to reproduce the conditions of a typical refinery, and particularly the process side of such refinery equipment is discussed in some detail below. This laboratory unit is capable of reproducing process variables of petroleum refineries such as conditions of temperature, type feed, velocity, turbulence, heating input, as well as pressure variables are reproduced in the apparatus, thus simulating actual petroleum refinery processes. The apparatus is particularly useful in a program involving antifouling additives, since all of the above variables affect fouling deposit formations. The apparatus may likewise be tailored so that the various conditions under which it is run are suitably adjusted to exactly reproduce the operating conditions of any particular refinery system.

In its simplest description, this typical laboratory apparatus is composed of a reservoir for containing a test sample of a petroleum hydrocarbon liquid, a recirculating loop which has as a part thereof a heat exchange tube and a constant pressure regulating system for maintaining a uniform pressure within the recirculating loop. The pressure regulating system comprises a by-pass circuit which contains both an injection pump and pressure regulating means which maintains a uniform pressure throughout the apparatus. The pressure regulating unit is connected to the by-passer portion of the hydrocarbon liquid test stream. Hydraulic pressure is transmitted to all parts of the stream by a pressurized gas which is carefully metered and controlled in a pressurized receiver by means of a regulator valve and control bleed assembly. The apparatus also contains suitable temperature recording equipment and safety devices whereby it may be operated with a minimum of attendance and a maximum amount of safety.

An important concept lies in the use of an injection pump in conjunction with a recirculating pump to allow high pressures to be developed in the recirculating loop. For a more detailed understanding of the apparatus, reference may be had to the drawing of which:

FIG. 3 is a schematic side view of the apparatus of the invention showing a reservoir, pressure adjusting means, means for recording the temperature differential, an electrokinetic cell and streaming current measuring means;

FIG. 4 is an enlarged vertical section of the electrokinetic cell taken across the line 4—4 of FIG. 3;

FIG. 5 is a planned side view of the entire apparatus encased in a portable box used for both shielding and transportation;

Figure 1:
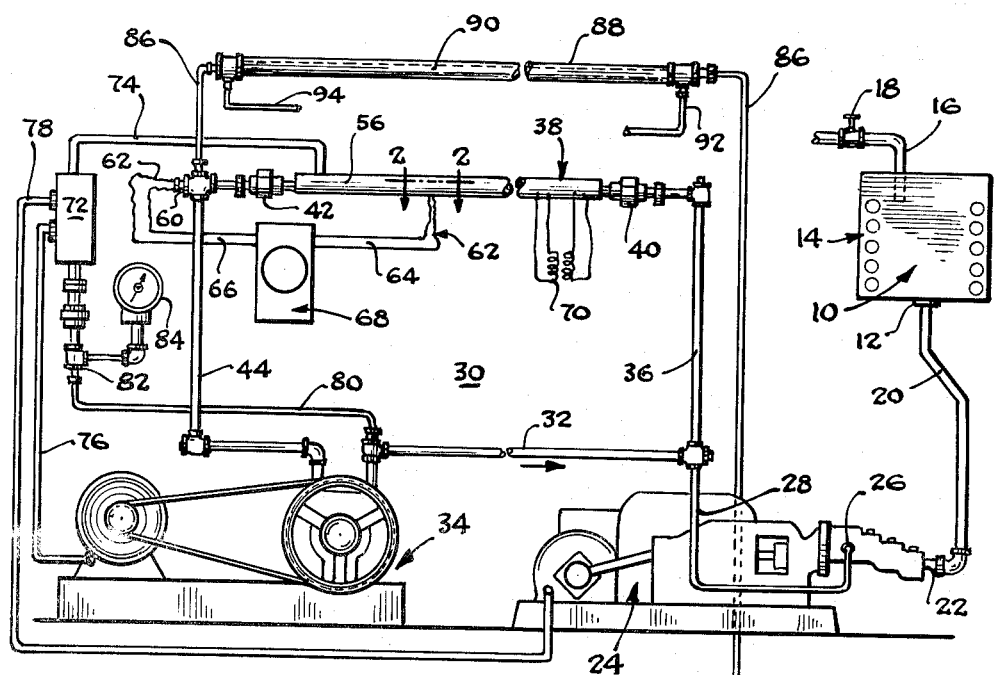
FIG. 1 is a schematic side view of the prior art laboratory apparatus showing the recirculating loop, heat exchanger and the pressure adjusting means for maintaining a uniform pressure within the apparatus.
Figure 2:
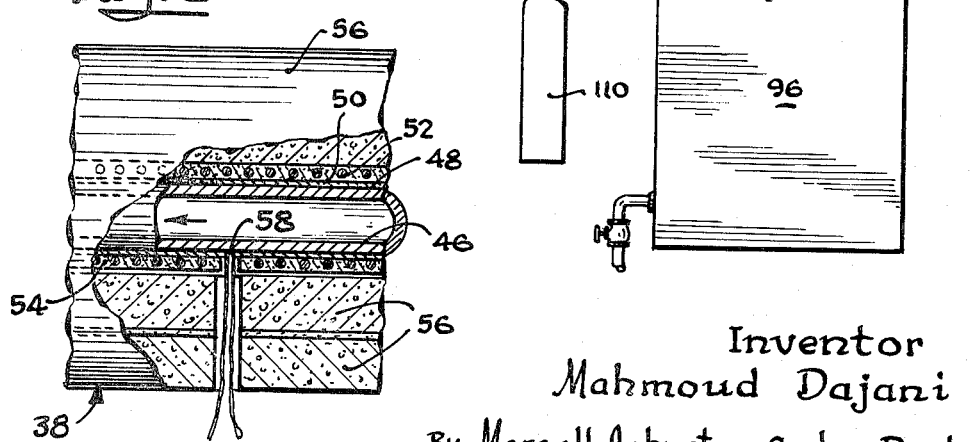
FIG. 2 is a horizontal, enlarged, broken away in part section of the heat exchanger tube taken across the line 2—2 of FIG. 1.
Figure 6:
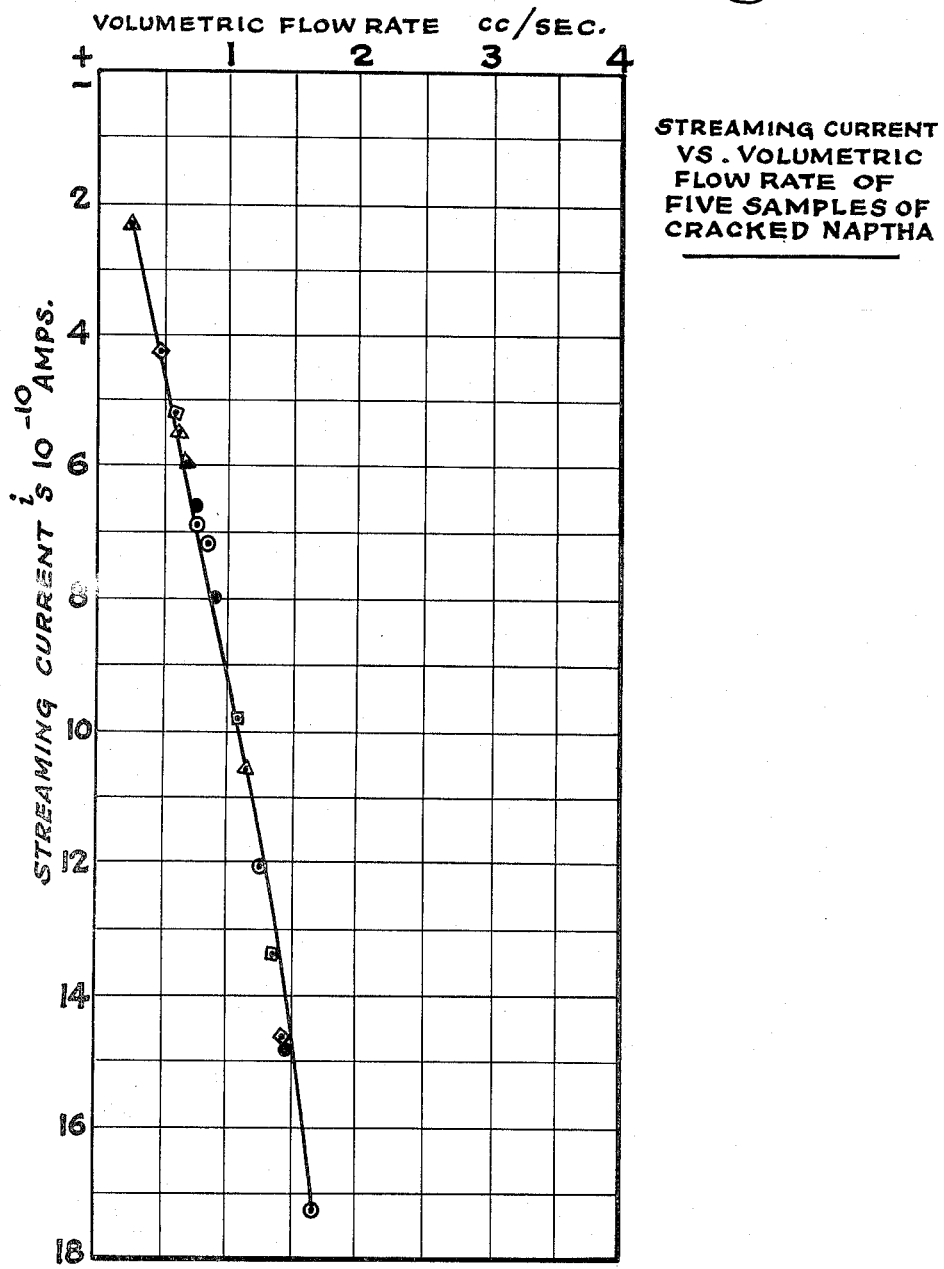
Figure 7:
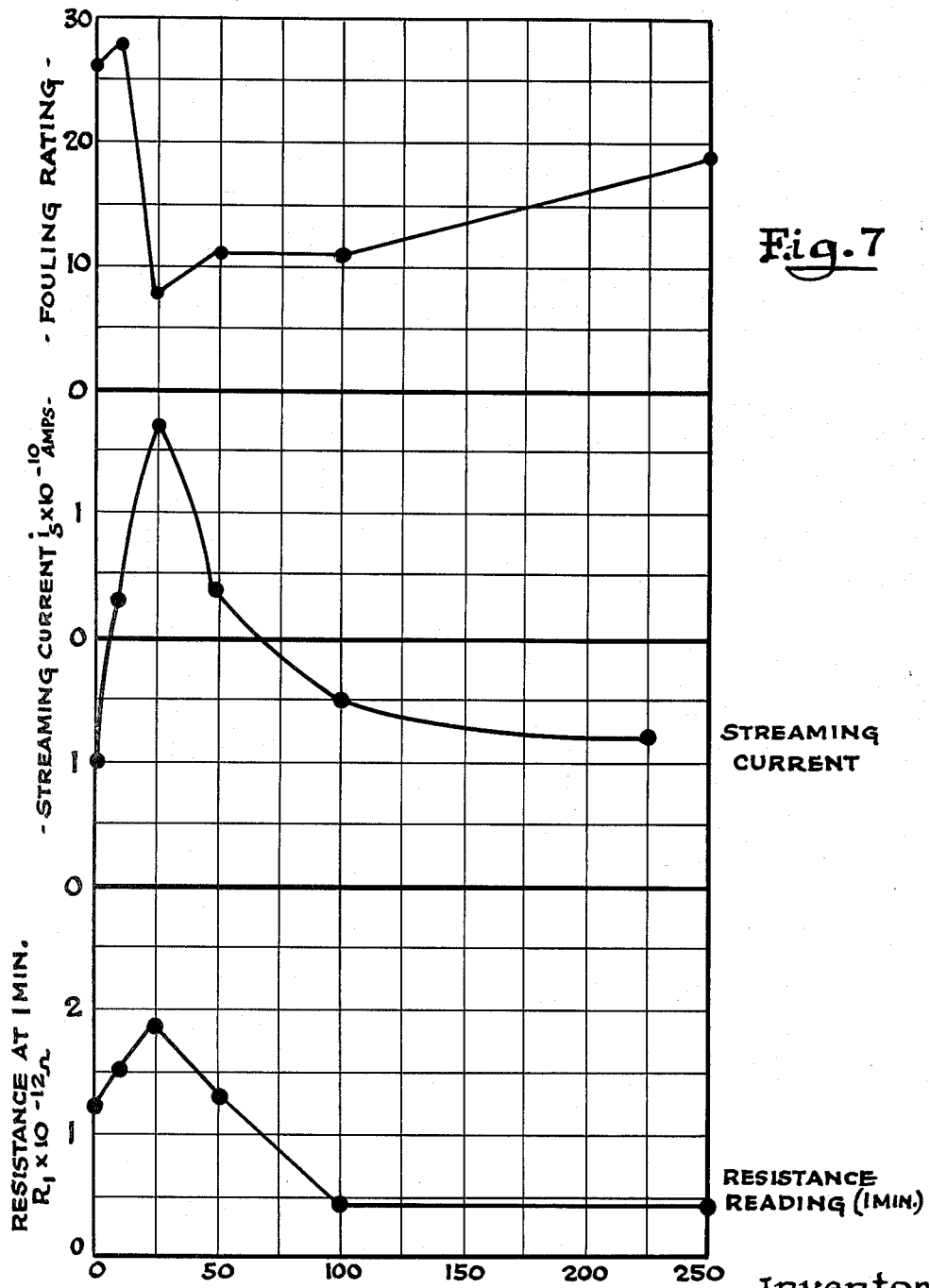
Figure 8:
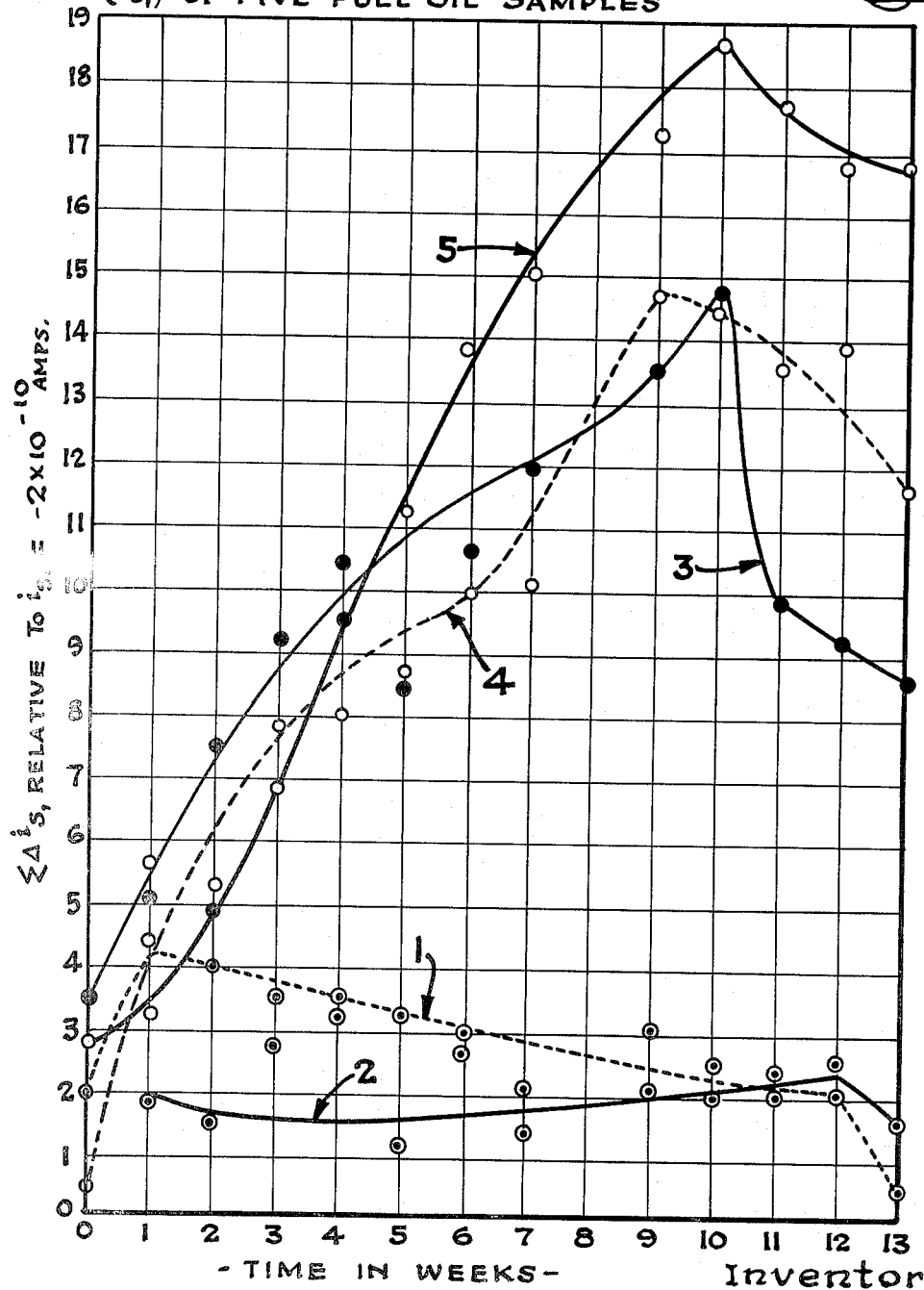
Figure 9:
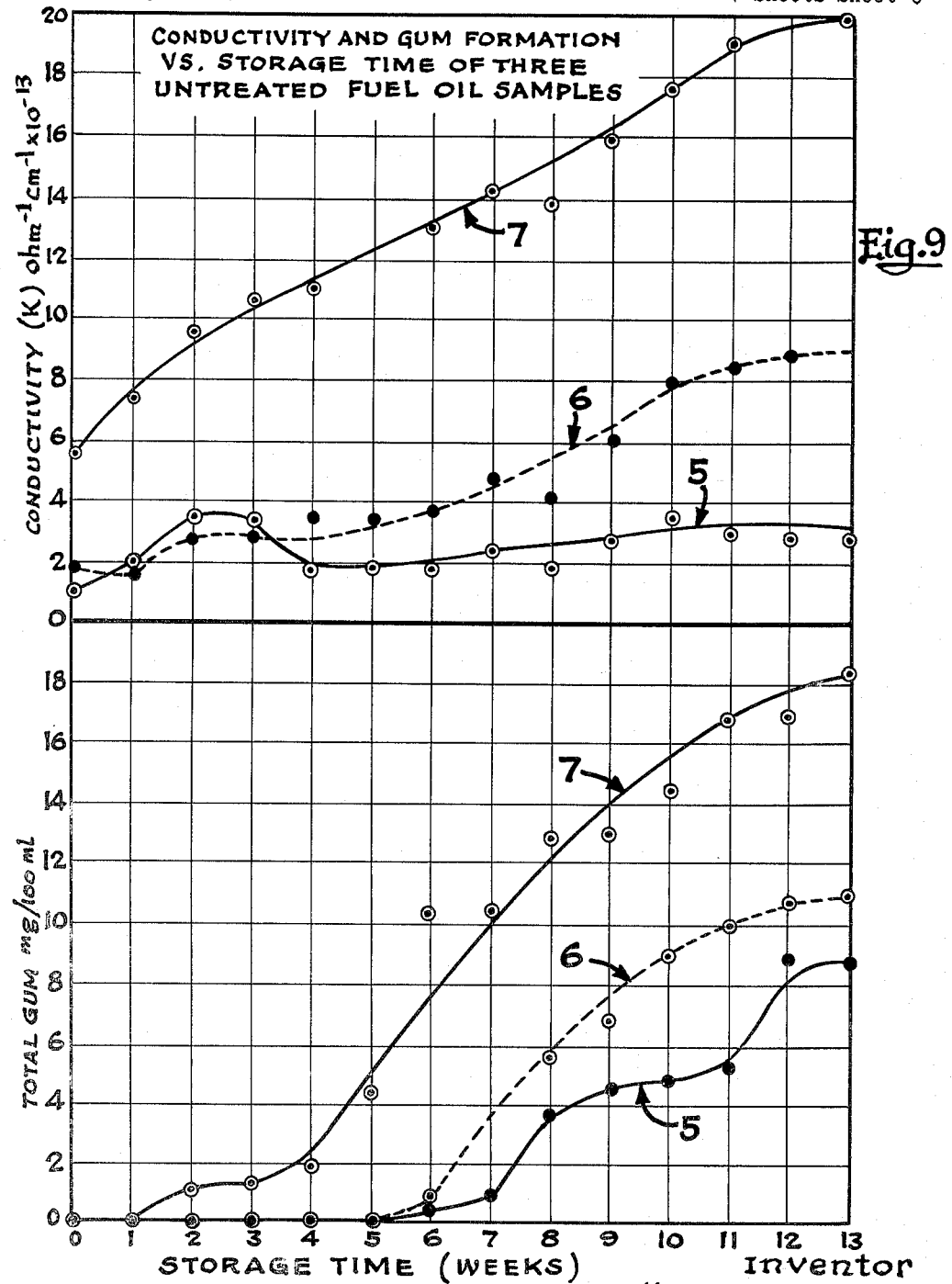

FIG. 6 demonstrates the reproducibility of the method of the invention in using the apparatus;

FIG. 7 demonstrates the usefulness of measuring potential in obtaining a picture of maximum dosage and efficiency of proposed additives;

FIG. 8 shows changes in streaming currents run at 1 cc./sec. of five fuel oil samples;

FIG. 9 is a comparison between conductivity changes of three fuel oil samples; and FIG. 10 shows variations in streaming current with time of three samples.

In operation of the prior art apparatus, the hydrocarbon liquid to be tested is placed in the reservoir 10 and introduced into the system through injection pump. Depending upon the nature of the particular stock to be treated, heat and agitation may be used in the operation of the reservoir. The receiver inlet valve 98 and the gas bleed valve 112 are closed whereas the receiver by-pass valve 100 is open. Inert gas is fed to the receiver at this point by opening valve 104. The pressure and temperature limit switches 72 are turned on and the injection pump 24 is actuated.

When the feed flows continuously from the drain 101 mining the efficiency and optimum dosage of antifouling additives or stabilizing additives used to treat petroleum intermediate distillates and petroleum products respectively. In such cases, it is only necessary to add various predetermined incremental dosages of the proposed additives to aliquot samples of the intermediate distillates or products to be treated, again store the samples for a time sufficient to allow electrokinetic changes and measure the streaming current of the samples under conditions of laminar flow at intervals during the storage period. The magnitude of fluctuation of streaming current is then observed during the storage period and plotted against storage time. Such a method offers a convenient and rapid method of determining whether or not a proposed additive is carrying out its role in either stabilizing or reducing the fouling tendencies of petroleum fluids. Thus, for example, if the streaming current is rising or falling rapidly, for any particular sample, it can be quickly seen that the proposed additive is not working to any substantial degree. Likewise, if the same additive has been used to treat various samples of petroleum fluids, but at different levels of treatment, observation of the fluctuation of streaming currents during the storage period determines what particular dosage of the additive is necessary for best efficiency. It is not essential to actually curve the streaming current versus the storage period in order to see the magnitude of fluctuations, but such is a helpful tool in arriving at more meaningful results. All that is essential is recordation of the streaming current at various times during the storage and a visual determination of the change of streaming current.

As mentioned above, the advantages of such a method in allowing rapid determinations, rather than a long drawn-out determination over many months, is a distinct advantage to the art. By employing the instant invention it is possible in a matter of a few weeks to determine the fouling and instability tendencies of hydrocarbon fluids, and/or the efficiency and optimum dosage of antifouling or stabilizing additives merely by observation of the magnitude of fluctuation of streaming current during the storage period. Once the fluctuations have started, the testing may be terminated, and a new series of tests begun. Thus, the physical and chemical characteristics of petroleum fluids, treated and untreated, may be determined in far less time than could be done in prior art testing. Specifically illustrated examples of the concept of the invention will appear hereinafter.

In order to run the test on the petroleum intermediate distillates or final products thereof, it has been found that the storage and testing time must generally last for a period to two weeks. After this period of time meaningful results are already available. The storage temperature may range from room temperature, that is 72 ±5° F., to about below the boiling point of the products or intermediate distillates. In order to obtain the most correlative determination, the petroleum products or intermediate distillates, treated or untreated should be stored at temperatures ranging from 95° to 125° F., from about 10 to about 16 weeks. However, as mentioned above, definite trends as to fouling characteristics and stability tendencies of treated and untreated hydrocarbon liquids may be observed in a few days of testing via the streaming current method of the invention.

The method is suited for testing any intermediate petroleum distillate such as naphthas, gas oils, etc. The final petroleum products which may be tested for stability include fuel oils, gasolines, mineral oils, catalytically-cracked gasolines, etc. When proposed additives are to be tested for effectivenes in the above, there is no limitation as to the type, or physical or chemical structure of the particular additive to be tested.

In order to determine how fouling and stability characteristics may be studied by resort to measurement of streaming current of hydrocarbons, the following theory is proposed.

Sulfur, nitrogen and oxygen compounds, and trace metal contaminants have been generally considered as major causes of hydrocarbon instability by most workers in the field. These contaminants are generally present in many forms in crude oils, and carry over into the different process products in many different forms. They are generally polar in nature and can be present as ionic species in the hydrocarbon. These compounds usually interact under various conditions resulting in gum formation or fouling products.

The generation of static charge in tubes carrying hydrocarbon products has been studied and it was concluded that the charge generation can be electrokinetic in nature and can be also related to the presence of ionic contaminants in the hydrocarbon.

Further, at the interface between a solid and a liquid containing dissolved ions, adsorption of ions of one sign or the other will give rise to a potential difference across the interface. In the simplest situation, the potential across the interface would cause a double layer of charge to appear in the liquid at the interface with charges of opposite sign to those adsorbed, since equal adsorption of both kinds of ions is highly improbable. In its simplest form the double layer consists of two parts, a fixed layer, usually called "Stern" or potential-determining layer where the ions are adsorbed strongly enough to be immobile, and a diffuse layer consisting of both kinds of ions with an excess of ions oppositely charged to those directly adsorbed. This layer, sometimes called the "Gouy" layer, is produced by the antagonistic effects of the electric forces tending to unite the mobile and fixed charges, and the thermal agitation of the ions tending to disperse the mobile charges by diffusion over the entire liquid volume. The diffuse layer extends into the boundary of the double layer. The effect of the Stern and diffuse layers is always to reduce the net potential to zero.

After the double layer has formed at the liquid-solid interface it may be considered in an equilibrium condition in which conduction of ions in the potential field near the surface is balanced by a counter diffusion down the ionic concentration gradient thus set in.

All electrokinetic phenomena have to be explained by the inter-action between a flow of electricity and a flow of liquid in the double layer. In considerations based upon the image of a diffuse double layer, it has been found that a layer of the liquid with a thickness of one or a few molecules (Stern layer) is stationary with respect to the wall. When the mobile part of the double layer moves with respect to the wall, a potential drop is caused in the slipping plane between the fixed and flowing liquid and is determinative of the electrokinetic phenomena. This potential is usually called the zeta potential.

Several electrokinetic phenomena at solid-liquid interfaces with relative motion between the phases, have been extensively studied and are comparatively well understood in relatively conductive fluids, such as aqueous solutions of electrolytes. Summaries of the experimental observations, and the theories of electroosmosis, electrophoresis and the streaming potential in such fluids may be obtained in standard references.

An electrokinetic effect less extensively studied, for which there has been no adequate theoretical explanation, is the generation of charge in low conductivity, low dielectric constant liquids, such as hydrocarbons, when they flow past solid surfaces. Several difficulties become immediately apparent in this area. One of these difficulties is that an important part of the experimental work is handicapped by the circumstance that there is no leading theory generally accepted by all investigators. However, in works reported by several investigators, the classical theory of electrokinetic phenomena was found to apply to low conductivity fluids such as commercial oil products.

with no evidence of air bubbles, the recycle pump 34 is turned on. For a high pressure test, the recycle pump is set at maximum speed in order to facilitate the removal of air from the loop 30. When the flow of feed from the drain line 101 is continuous, the drain valve 100 is closed. With the closing of the valve, the pressure in the apparatus builds up due to the continuous injection of fresh feed.

When the pressure in the apparatus reaches the level established for the test, the receiver valve 98 is opened rapidly. The inert gas bleed valve 112 is then cracked slightly to allow the displacement of the inert gas by the waste fluid from the apparatus. A balance must be established between the inert gas bleed-off and the incoming inert gas to the receiver, plus the waste fluid, so that a steady pressure is held throughout the operation of the apparatus. That is to say, the combined pressures of the liquid and inert gas are balanced by the amount of inert gas bled through line 114 so that constant pressure is thereby established in both the pressurized receiver and the loop. Multiple recording thermometer 68 is turned on and the safety limit switch is de-energized until the unit achieves operating temperature and pressure. The power to the heat exchange tube 38 is turned on and the temperature regulated by adjusting variable transformer 70.

When it is desired to cool the hydrocarbon liquid prior to its entry into the pressurized receiver, the oil cooler 88 is operated by flowing cooling fluid thereinto through line 92.

An equilibrium or steady-state condition is reached when the oil temperature levels off and does not rise or fall more than three degrees during any half hour. The time required to reach equilibrium is usually two hours for gas oils and crudes, but may be somewhat more, or less, for naphthas. The oil and wall temperature differences may be conveniently determined every one-half hour after an equilibrium is established, and heat transfer coefficients then calibrated. The percentage drop in heat transfer is then determined. The percentage drop for a blank run is used as a standard of comparison in the evaluation of additives in subsequent tests.

While the above-described prior art stability tests and typical apparatus for determining fouling tendencies of petroleum hydrocarbon distillates and effect of various treatments are extremely useful in evaluating a program of petroleum hydrocarbon fluid control, certain drawbacks must be noted with regard to these and similar apparatuses and determination methods. For example, with regard to stability tests on finished petroleum products it generally consumes many months of testing time before truly meaningful results are forthcoming. Attempts to accelerate the testing procedure by subjecting the samples to more severe conditions of heat, are often fruitless since there is often a lack of correlation between the results obtained on a heated sample, and one which is tested at ambient or room temperatures over a longer period of time. Likewise, various test procedures must be devised according to the particular sample of petroleum hydrocarbon fluid tested in order to gather the most meaningful results. In other words, one particular laboratory method is not always suitable for use in testing a wide variety of petroleum products, differing greatly in their chemical and physical characteristics such as instability tendencies, oxidative susceptibilities, etc. For example, testing for oxidative instability of various petroleum fluids and usefulness of proposed antioxidants in these same fluids by means of known techniques such as the induction period method described in ASTM Designation D525–49 often results in poor reproducibility unless the pressure in the oxygen closed bomb and temperature is suitably varied according to the particular sample being tested.

In addition to the above difficulties of reproducibility, necessity for costly long-term testing with frequent supervision, frequent changes in test procedures to meet the particular needs of the petroleum hydrocarbon fluid being tested, other objections are also noticed with regard to known methods of testing fouling and instability tendencies of petroleum hydrocarbons. For example, while the fouling apparatus described in great detail above has found fruitful use in a proposed laboratory program of evaluating antifouling additives, it too has certain drawbacks. In particular, in order to reproduce refinery conditions, the apparatus itself must necessarily be somewhat sophisticated, intricate, difficult to construct, and takes up necessary laboratory testing space. More particularly, the unit is not devised for on-the-spot testing at petroleum refineries themselves, but rather is generally limited to testing in the laboratory area. Thus, samples must be shipped from the refinery, tested, and results relayed back to the refinery area of trouble. This method of determination is not desirable where immediate answers to various refinery problems are needed.

It would therefore be a benefit to the petroleum industry if a method of testing by a single technique could be devised using a minimum of equipment, could be adapted to use in the refinery itself, and has the added advantage in that little calculation need be made by the average skilled technician to evaluate such tendencies. Such a method would find ready acceptance in the field of petroleum testing.

It therefore becomes the object of this invention to provide a method of determining fouling tendencies of petroleum hydrocarbons and efficiency and optimum dosages of antifouling additives used in treating such petroleum hydrocarbon intermediate distillates, which method is simple, easy to carry out with a minimum of calculation, and may be carried out even at the refinery site itself.

Another object of the invention is to provide a method of likewise determining stability of finished petroleum hydrocarbon products and efficiencies and optimum dosages of chemical treating agents used to increase oxidative stability of these products.

Another object of the invention is to provide a method of determining zeta potentials of samples of hydrocarbon distillates which zeta potentials are an indication of the fouling and storage characteristics of these samples.

In accordance with the invention I have discovered a method of determining fouling tendencies of petroleum hydrocarbon intermediate distillates and also the stability of finished petroleum hydrocarbon products. In each case, the intermediate distillate or finished product is stored for a period of time sufficient to allow electrokinetic changes to occur in the intermediate or distillate product, the streaming current of the distillates or products are then measured under conditions of laminar flow at intervals during the storage period, and finally the magnitude of fluctuation of the streaming current is determined during the storage period. The magnitude of fluctuation of the streaming current has been found to be proportional to the fouling tendencies of distillates or the tendency toward instability of finished petroleum products.

In a specific embodiment of the invention the streaming current measured at various intervals is plotted against the storage time and a curve is thereby obtained. It has been found that when the streaming current is relatively constant, that is, during the relatively flat portions of the curve, fouling and instability tendencies are much less relative to those conditions of streaming current change. In many cases then, it can be promptly seen that the streaming current, as a measure of fouling and instability tendencies, is fluctuating a great deal at the initial part of the storage period or testing period. Once this is noted, it is thereby immediately determined that the particular hydrocarbon fluid has a tendency toward fouling or instability, and further storage and testing thereon need not be carried out.

As an adjunct to the above I have also discovered that the above-described method may be also used in deter- The fact that commercial oil products have much higher conductivities than highly purified hydrocarbons, points to substances being present that dissociate into ions. Since, in general, the degree of dissociation of the electrolytes under consideration is extremely small, ions removed by adsorption can easily be replenished. The total free charges (excess of one kind) observed in strongly charged hydrocarbons does not seem to be out of proportion compared with the total number of ions or charged colloidal particles of one kind present. Finally, the sign of the charge in hydrocarbon systems can be inverted by the addition of suitable electrolytes in much the same way as for aqueous systems. Thus it can be seen that the chemical theory using the concept of streaming potential currents, etc., is theoretically possible to be applied to hydrocarbon systems as well as aqueous systems.

Thus, from the above discussion it can be seen that my method can be carried out by any number of different apparatuses. All must have in common some type of electrokinetic cell for detecting streaming currents of hydrocarbon liquids flowing through the cell, some type of porous plug to impede the flow of the petroleum hydrocarbon and thereby induce a streaming current, and finally, some means of measuring the induced streaming current. The apparatus should be non-conducting in order to contain the current so induced. I have discovered a specific apparatus which is admirably suited for measuring streaming currents and thereby determining fouling and instability tendencies of petroleum hydrocarbon liquids. This I will also describe in greater detail below.

In a variation of the above method it has also been discovered that the fouling and storage characteristics of petroleum hydrocarbon fluids may be further investigated by means of determining the zeta potentials of the respective fluids. By likewise determining the zeta potentials of a substantially depolarized sample of the petroleum hydrocarbon fluid and comparing the differences of the zeta potentials, the fouling and storage characteristics are indicated.

The following calculations were made in order to determine the specific variables which must be measured in order to calculate the zeta potential.

The streaming current, $i_s$, is obtained by integrating the product of charge density $s$ and velocity $v$ over the cross-sectional area of the electric double layer. The double layer can be considered as being a thin, flat layer having a breadth equal to the inner circumference of the tube. Thus the following calculation of zeta potential from a reading of streaming current may be made for a liquid flowing through a pipe or tube with a circular cross-section.

1. $$i_s = \pi D \int sv\, dx$$

where:

D is diameter of the pipe
$x$ is the distance from the pipe wall
$i_s$ is streaming current
$s$ is charge density and
$v$ is velocity over cross-sectional area of double layer.

For laminar flow, the shear stress, $\lambda_s$, and viscosity of the liquid, $\eta$, are related to the velocity gradient, $dv/dx$, or change in velocity with distance from the wall as follows, 2. $$\lambda_s = \eta \frac{dv}{dx}$$

so that in the thin layer near the wall, assuming that the shear stress is constant throughout the double layer (velocity profile linear), 3. $$v = \frac{\lambda_{s0} X}{\eta}$$

where $\lambda_{s0}$ is the shear stress near the pipe wall.

Using Poisson's equation, which relates charge density to velocity gradient as follows, $$S = -(\epsilon \epsilon_0)\left(\frac{d^2v}{dx^2}\right)$$

and combining it with Equations 1 and 3 we get,

4. $$i_s = \left(\frac{\pi D \lambda_{s0} \epsilon \epsilon_0}{\eta}\right) \int x \frac{d^2x}{dx^2}\, dv$$

Partial integration yields

5. $$i_s = \left(\frac{-\pi D \lambda_{s0} \epsilon \epsilon_0}{\eta}\right)\left[x\frac{dv}{dx}\int - \int \frac{dv}{dx}dx\right]$$

The integration is carried out between the plane near the wall where the liquid starts to move ($x=0$) and a plane in the liquid where, $$\frac{dv}{dx} = 0$$

The units to be used here should be the rationalized Giorgi system, or the practical system where:

$V_s$ is in volts (streaming potential)
$\epsilon$ dimension less (dielectric contrast of hydrocarbon fluid)
$\epsilon_0$ the dielectric constant of vacuum $= 8.854 \times 10^{-14}$ A. sec. V$^{-1}$ cm.$^{-1}$
$\zeta$ is in volts (zeta potential)
K is in ohm$^{-1}$ cm.$^{-1}$ (fluid conductivity)
$\eta$ is in $g_f$ sec. cm.$^{-2}$ (viscosity of hydrocarbon fluid) (1 centipoise $= 1.02 \times 10^{-5}$ $g_f$ sec. cm.$^{-2}$)
$\Delta P$ is in $g_f$ cm.$^{-2}$ (pressure drop across the porous plug).

The above determinations were made on a sample of cracked naphtha in order to measure its zeta potential from streaming potential etc., measurements.

$\Delta P = 3.39 \times 10^{-1}$ $g_f$ cm.
$V_s = 7.2$ volts
$\epsilon = 2$
$\epsilon_0 = 8.854 \times 10^{-14}$ A. sec. V$^{-1}$ cm.$^{-1}$
$\eta = 1.83 \times 10^{-5}$ $g_f$ sec. cm.$^{-2}$
$K = 5.2 \times 10^{-12}$ ohm$^{-1}$ cm.$^{-1}$ $$\frac{V_s}{\Delta P} = \frac{\epsilon \epsilon_0 \zeta}{\eta K} \text{ or } \zeta = \frac{V_s K \eta}{\epsilon \epsilon_0 \Delta P} =$$

$$\frac{-7.2 \text{ (volts)} \times 1.83 \times 10^{-5} (g_f \text{ sec. cm.}^{-2}) \times 5.2 \times 10^{-12} \text{ (ohm}^{-1}\text{ cm.}^{-1})}{2 \times 8.854 \times 10^{-14} \text{ (A. sec. V}^{-1}\text{ cm.}^{-1}) \times 3.39 \times 10^{-1} g_f \text{ cm.}^{-2}} =$$

$$-11.5 \times 10^{-3} \text{ volts} = 11.5 \text{ mv.}$$

$$\int \frac{dv}{dx} dx$$

represents the potential difference between the bulk of the liquid and the plane where the liquid starts to move. This potential difference is defined in colloid chemistry as the electrokinetic potential $\zeta$ with a minus sign.

then $$i_s = \frac{\pi D \lambda_{s0} \epsilon \epsilon_0}{\eta}$$

since $$\pi D \lambda_{s0} = \frac{A_p}{L}\Delta P$$

where $A_p$ is the cross sectional area of the pipe,
$\Delta P$ is the pressure drop across the plug, and
L is its length, then $$i_s = \frac{A_p}{L} \frac{\epsilon \epsilon_0 \zeta \Delta P}{\eta}$$

Therefore, assuming the electric double layer is confined within a region of laminar flow, the streaming current is proportional to the pressure gradient across the plug and no detailed knowledge of the potential distribution within the double layer is needed.

If we equate $i_s$ to minus the leakage current through the liquid contents of the tube as determined by Ohm's law $$i_s = -V_s \frac{A_p}{L} K$$

it follows that $$V_s = \frac{\epsilon \epsilon_0 \zeta \Delta P}{K}$$

Therefore, measuring the streaming potential at very low flow rates (to guarantee laminar flow), the pressure drop across the plug, conductivity and viscosity will allow calculation of $\zeta$ as shown below.

Thus to determine fouling and storage characteristics by means of measurement of zeta potential, it is only necessary to take either an intermediate distillate or final petroleum product, depolarize a portion of the product and determine the zeta potential on both the polarized and non-polarized portions. As is seen above the zeta potential is calculated by a measurement of streaming potential, fluid conductivity, pressure drop of the liquid samples flowing through a porous non-conducting plug of an electrokinetic cell, dielectric constants of vacuum and hydrocarbon, and specific viscosity. From these measurements the zeta potentials of both the polarized and non-polarized samples may be calculated by the following equation as derived above:

$$\zeta = \frac{V_s K \eta}{\epsilon \epsilon_0 \Delta P}$$

where the symbols represent measurements as defined just above.

The differences of the calculated zeta potentials of the purified sample of the petroleum hydrocarbon fluid and the sample as such coming directly from the refinery stream or storage area are then compared. The differences between the two thus calculated zeta potentials indicate the fouling and storage characteristics of the particular petroleum hydrocarbon fluid tested.

The above method of determining zeta potentials can be likewise applied to intermediate distillates and their products to which have been added incremental dosages of additives to various aliquot portions of these hydrocarbons. Again, the efficiency and optimum dosage of the antifouling and stabilizing additives may be determined by comparing the zeta potentials obtained and calculated from various treated samples at different dosage levels, the untreated petroleum hydrocarbon sample and a depolarized sample of the hydrocarbon fluid. The differences of the zeta potentials of all these are observed and indicate the fouling and storage characteristics of the treated, and untreated petroleum hydrocarbons.

As mentioned above, I have also discovered an apparatus for determining the fouling and instability tendencies of petroleum hydrocarbon liquid. This apparatus is admirably suited for use in the above methods of determining the fouling and storage characteristics of petroleum fluids, as well as zeta potentials of treated and untreated samples of the fluids.

In its simplest embodiment, the invention provides an apparatus for use in both laboratory and field sites which is composed of an electrokinetic cell capable of detecting streaming currents caused by petroleum hydrocarbon liquids flowing through the cell, means for conducting the petroleum hydrocarbon liquids to the cell, regulating means for controlling the flow of the petroleum to the electrokinetic cell, electrical means for measuring these streaming currents of the liquids flowing through the electrokinetic cell and discharge means for removing the petroleum hydrocarbon liquids from the electrokinetic cell. The electrokinetic cell itself is generally comprised of non-hydratable, hydrophobic tubular conductor which has a very low electrical conductance, preferably less than $1 \times 10^{-14}$, an inlet and outlet positioned near about the ends of the tubular conductor, and a porous non-conducting plug positioned within the tubular conductor between the inlet and outlet for restricting the flow of the petroleum hydrocarbon liquid. The porous non-conducting plug should have openings which have an average diameter no greater than 20 times the thickness of the diffuse layer of the petroleum hydrocarbon liquids tested. Also, the electrodes within the electrokinetic cell should be positioned on opposite sides of the plug and equidistant therefrom. Lastly, there should be means available to measure the pressure differential across the porous plug.

An important concept of the invention lies in the fact that the apparatus is composed of relatively electrically non-conducting material. It is essential that the induced streaming current is not dissipated away from the apparatus, but rather flows into the electrical measuring means. In a preferred embodiment the electrokinetic cell is shielded from electrical disturbances. This shield effect is most easily accomplished by merely setting the electrokinetic cell into a metal box. This box may be made of any suitable material such as aluminum, tin, titanium, copper, steel, etc.

In another preferred embodiment the electrical measuring means for determining streaming currents is an electrometer. Likewise, the tubular conductor comprising a portion of the electrokinetic cell is preferably composed of an essentially non-conducting material such as Teflon. Also, the porous plug through which the hydrocarbon liquids flow, thereby setting up a streaming current, is preferably composed of sintered glass.

For best results, it is necessary to adjust the flow rate within rather closely controlled ranges. Therefore the apparatus preferably contains both a coarse and fine adjusting valve. In another preferred embodiment the pressure differential measuring means is composed of a manometer. Also, it is preferred that the source of petroleum hydrocarbon liquid, as fed into the cell, be continued in some type of reservoir fixed above the cell whereby gravity flow is achieved.

With particular reference to the drawings, the hydrocarbon liquid to be tested in the apparatus is contained in a reservoir vessel designated generally by the numeral 119. This reservoir may be constructed of any suitable material, but it is preferred that it be composed of a non-conducting type material such as polyethylene or any other hydrophobic substance. The reservoir has an outlet 126 which is connected to a feedline 128.

The outlet feedline 128 leads into adjusting valves 129 and 130. For best control of flow rate valve 129 should be so constructed to give rough control while the second valve 130 should be a fine control valve. These valves are preferably needle valves with the fine control valve being a micrometer needle valve. Again, it is preferred the valve elements also be made out of non-conducting plastic materials such as polyvinyl chloride, Teflon, polyethylene, etc.

The line leading from the flow adjusting means as exemplified by the various control valves is designated as 131 and is coupled into the electrokinetic cell 122. The cell inlet line 131 is connected to the electrokinetic cell by means of a male conductor 133.

After the hydrocarbon liquid has flowed through the electrokinetic cell setting up a streaming current, the fluid flows to cell outlet line 135 through male conductor 134. This line in turn leads to a manometer 121 used to measure the pressure differential across the porous plug in the electrokinetic cell. A portion of the hydrocarbon fluid is used to make this pressure differential measurement, while the remainder flows through discharge line 132 into discharge receiver 142.

The streaming current induced by the hydrocarbon flow is set up within the diffused double layer of the fluid contained within the electrokinetic cell. The streaming current is picked up by electrodes 139 which in turn are connected to leads 140. These leads are connected to an electrometer 124 which is used to measure both the streaming current and streaming potential set up in the fluid. The instrument should be properly grounded to facilitate drainage of residual charge as shown by ground wire 144.

The electrometer may be any electrical detecting instrument capable of measuring at least the amperage induced by the hydrocarbon flow. Preferred is an apparatus which is capable of measuring streaming potential, streaming current and fluid electrical resistance.

The electrokinetic cell may be held in place in its shield 146 by a clamp attached thereto 148. The entire apparatus may be enclosed in a suitable box 150 capable of being closed and readily transported.

The components of the electrokinetic cell 122 are shown in detail and to best advantage in FIG. 4. The electrokinetic cell is composed essentially of a non-hydratable, hydrophobic tubular member 152. As shown in FIG. 4, the tubular member is composed of two parts having standard pipe threads on both the inside and outside of the hollow tubular member. The two portions of the tubular member are connected by coupling 154 through threads 156. It is essential that the tubular member be non-conducting and must be composed of a material having an electrical conductivity less than $1 \times 10^{-14}$. Such materials as polyethylene, Teflon, halogenated paraffins, etc., are suitable for such use. The two outer ends of the tubular members 152 have male members 158 to hold tubings 160. In each section of the tubing an electrode is sealed with a resinous material whereby the electrode extends into the open interior portion of the tubular member. It is essential that each electrode should be spaced equidistant from the porous plug 138, which porous plug is housed in a recessed area which is cut out of one section of the tubular member. The porous plug is preferably composed of fritted glass. For example, an excellent disc is composed of Pyrex glass having a pore size within the range of 170 to 210 microns. As shown above, the electrodes are connected through leads into the electrometer. In one specific embodiment the electrokinetic cell consists of two Teflon parts made from 2.5" long round stock with a ½" hole bore longitudinally therethrough and standard pipe thread on both the outside and inside. The two parts or portions of the tubular member are coupled with a ¾" NPT Teflon coupling. The outer ends of the two parts each have ¼" x ¼" male members to hold 2⅞" length of ¼" Teflon tubing. In each section of tubing, a 3.4" long 0.04" diameter platinum wire is sealed with epoxy resin. The two parts are also respectively fitted with ¼" x ⅛" radially directed male members 133 and 134 to allow the feed to flow in and out of cell. A recess is cut out in the lower end of the upper part of tubular member 152 to house the fritted glass disc which is an extra coarse Pyrex disc having a pore size within the aforementioned limits.

A preferred electrometer is one which may be used both as an ultra-high impedance voltmeter and also as a direct-reading ammeter and ohmmeter. A convenient electrometer likewise presents its information on linear scales whereby current, voltage and resistance readings are easily made. A preferred electrometer is the Kiethley 600A or 610A electrometer.

The following is a typical means of operating the above-described apparatus in order to obtain meaningful streaming current and streaming potential figures. After all the parts of the apparatus have been properly connected, 500 ml. of depolarized filtered heptane or other purified aliphatic hydrocarbon are introduced into the reservoir, the two valves are opened wide and the fluid is allowed to flow until all air is driven out of the system and a steady flow of fluid is observed. A streaming current reading is then taken on the electrometer. This reading should be in the neighborhood of $-0.5 \times 10^{-11}$ amps for heptane when the cell is clean. If the reading is considerably higher, larger volumes of heptane are allowed to flow until the reading is stabilized near $-0.5 \times 10^{-11}$ amps. This indicates that the apparatus is ready for operation. At this point the heptane is drained out of the system and a 500 ml. aliquot of the fluid under study is introduced into the reservoir and allowed to flow through the system until a steady flow is observed. The micrometer valve is then closed and an additional volume of the fluid is introduced to make up the original 500 ml.

The valve is now opened slightly to give a head difference in the manometer of 0.5 cm. When this is done, a graduated cylinder is placed under the outlet and the time required for 50 ml. to flow into its is measured with a stopwatch. While the fluid is flowing, the streaming current and potential should be read at their most steady values. This is easily attained with current readings which stabilize fast and are relatively free of drift; however, streaming potential readings have a tendency to attain equilibrium slowly due to the slow response of the electrometer. Therefore, streaming potentials should be read carefully and at very low flow rates (head differences of 0.2 to 0.5 cm.). The streaming current readings should be taken at head difference ($H_m$) of 1.0, 1.5, and 2.0 cm. respectively. The streaming current values obtained ($i_s$) should then be plotted against volumetric flow rate (cc. per sec.) and a straight line should be obtained at low flow rates (laminar region). Linearity of the curve in this region is an indication of proper operating conditions. The valve is then shut off completely and the system is allowed a few minutes to drain its residual charge until the pointer of the electrometer rests in the neighborhood of zero. This is followed by measurement of the fluid resistance. It is desirable to obtain the absolute resistance of the fluid; however, some hydrocarbon fluids have resistance higher than the electrometer's range ($10^{14}$ ohms). In this case, a relatively resistance reading is taken at the arbitrary time of one minute. After the resistance is measured, the conductivity of the fluids is calculated as shown below.

The resistance $$R = \rho \frac{L}{A}$$

where:

$\rho$ is the resistivity of the sample in ohm-cm.
L is the separation of the two electrodes in cm.
A is the area in cm.$^2$.

The reciprocal of $\rho$ is the conductivity K of the sample in ohm$^{-1}$ cm.$^{-1}$. The term, $L/A$, is called the cell constant, a property that varies from cell to cell and depends on the cell's geometry.

(1) Using a conductivity cell of a constant equal to 0.1 cm.$^{-1}$ to measure the conductivity of a standard 0.00001 N HCl solution with an A.C. conductivity bridge, model RC–16B2, at 1000 cycles per sec.

$$K = 79 \times 10^{-6} \text{ ohm}^{-1} \text{ cm.}^{-1} \text{ at } 82° \text{ F.}$$

(2) The resistance of the same solution was measured as above in the streaming potential cell without the porous plug.

$$R = 275 \times 10^2 \text{ ohm at } 82° \text{ F.}$$

(3) The resistance of the same solution was measured as above in the streaming potential cell containing the porous plug.

$$R = 365 \times 10^2 \text{ ohm at } 82° \text{ F.}$$

(4) The cell constant was then calculated:

(a) With the plug $$L/A = RK = 365 \times 10^2 \times 79 \times 10^{-6} = 2.87 \text{ cm}^{-1}$$

(b) Without the plug $$L/A = RK = 275 \times 10^2 \times 79 \times 10^{-6} = 1.97 \text{ cm.}^{-1}$$

When an additive is introduced to the fluid under study, it should be mixed well before any readings are taken. The same procedure above is then repeated to obtain $V_s$, $i_s$, and R. Both density and viscosity of each fluid should be measured to allow calculation of pressure drop across the plug as calculated below.

For an inverted U tube, differential manometer (Chemical Engineering Handbook, John H. Perry, Ed., Third edition, page 364, 1950).

$$\Delta P = \frac{1}{144} \frac{H_m}{12}(P_A - P_m) + \frac{P_A}{12}(K_A - K_B)$$

where:

$\Delta P$ = pressure drop across the porous plug
$H_m$ = difference in height of the liquid columns in the manometer due to flow in inches
$P_A$ = density of the fluid under consideration in lbs. per cu. ft.
$P_m$ = density of air (negligible)
$K_A - K_B$ = static difference in height of the liquid columns in the manometer In the static condition $H_m = 0$, therefore, the pressure drop in such condition is:

$$\Delta P_1 = \frac{1}{144} \frac{P_A}{12}(K_A - K_B)$$

when flow occurs, $H_m > 0$, therefore, the pressure drop under flow condition is:

$$\Delta P_2 = \frac{1}{144}\left[\frac{H_m}{12}(P_A) + \frac{P_A}{12}(K_A - K_B)\right]$$

The pressure drop across the plug is therefore $\Delta P$ where:

$$\Delta P = \Delta P_2 - \Delta P_1 = \frac{1}{144 \times 12} P_A H_m$$

or $$\Delta P = \frac{P_A H_m}{1728} \text{ lbs.}_F \text{ per in.}^2$$

or $$\Delta P = \frac{70.31 P_A H_m}{1728} g_F \text{ per cm.}^2$$

SAMPLE CALCULATION OF $\Delta P$

[Cracked naphtha]

$H_m = 0.177$ in.
$P_A = 47$ lbs. ft.$^{-3}$ $$\Delta P = \frac{70.31 \times 47 \times 0.177}{1728} = 3.39 \times 10^{-1} g \text{ cm.}^{-2}$$

After each evaluation, the system should be rinsed well with depolarized filtered heptane until $i_s$ is almost zero. If this is difficult to attain, the cell should be disconnected and cleaned with acetone (sandblasted, if possible), dried and then used again.

The manometer should be rinsed carefully with heptane after every evaluation and care must be taken to avoid mixing two fluids in the manometer.

In order to obtain true streaming current and determinations, certain factors must be present. These critical factors are met by the practice of the method of the invention, and by specifically carrying out that method with the apparatus above. For example, the electric double layer should be thin compared with the diameter of the tube or the pore size of the plug so that the curvature of the wall need not be taken into consideration as was discussed in the calculation of the zeta potential above.

Also, flow of the liquid must be laminar, a condition easily fulfilled in practice. Work showed that in the laminar region, a linear relationship exists between streaming currents and flow velocities. Therefore, as long as the electric double layer is confined within a region of laminar flow, streaming current is proportional to the pressure gradient across the plug and no detailed knowledge of the potential distribution within the double layer is needed. This is the normal situation for aqueous liquids, not only in laminar flow, but also in turbulent flow. The problem becomes more complicated for non-aqueous systems in turbulent flow where the laminar sublayer may become thinner than the currents and flow velocities, and zeta potentials higher in magnitude, to which an essentialy non-determinable correction has to be applied.

The conductance determining the resistance of the fluid should depend solely on the bulk conductivity of the liquid. Surface conductance should not play a part of any importance. To satisfy the first condition, knowledge of the approximate thickness of the double layer and the pore size are necessary. Calculation of $\delta$ (thickness of the double layer) can be attained by use of the equation:

$$\delta = \sqrt{\frac{\Delta m \epsilon \epsilon_0}{K}}$$

where $m$ is the coefficient of molecular diffusion and equals $$\frac{kT}{6\pi \eta a}$$

where $a$ is the radium of an ion and $\eta$ is the dynamic viscosity of the medium, $\epsilon$ is the dielectric constant of the liquid, $\epsilon_0$ is the absolute dielectric constant of vacuum ($8.854 \times 10^{-14}$ A sec. V$^{-1}$ cm.$^{-1}$), and K is the conductivity of the liquid (ohm$^{-1}$ cm.$^{-1}$). $\Delta m$ for hydrocarbons is found to be approximately equal to $1.9 \times 10^{-5}$ cm.$^2$ sec. The values for $\delta$ for a variety of hydrocarbon fluids were calculated and are shown below:

| Hydrocarbon | Conductivity | $\delta$ Approximate |
|---|---|---|
| Isooctane | $10^{-14}$ ohm$^{-1}$ cm$^{-1}$ | 184$\mu$ |
| Straight run naphthas and fuel oils | $10^{-13}$ ohm$^{-1}$ cm$^{-1}$ | 58$\mu$ |
| Cracked naphthas | $10^{-12}$ ohm$^{-1}$ cm$^{-1}$ | 18$\mu$ |

Therefore, a plug with an average pore size of 200$\mu$ should be satisfactory for most commercial hydrocarbon fluids except highly purified ones, where caution should be practiced.

The third condition can be satisfied by making the cell from a non-hydratable, hydrophobic substance such as polyalkylene compounds or specifically Teflon, which has a conductivity of $<10^{-18}$ ohm$^{-1}$ cm.$^{-1}$, a value much smaller than that of hydrocarbons. This eliminates leakage currents and gives reproducible results.

In order to determine the efficacy of the invention various experiments were carried out in efforts toward correlation of streaming current and its fluctuations, with fouling and instability characteristics of petroleum fluids. Further, the same type of procedure was used in evaluating the performance of known and proposed inhibitors. While the specific apparatus employed in measuring the streaming current was the one set forth in detail above, it is understood, of course, that any suitable apparatus may be used which is capable of determining streaming currents of hydrocarbon fluids with good reproducibility, accuracy, and in a minimum of time.

Using the apparatus of the invention and particularly measuring the streaming potentials, the pressure drop of the samples flowing through the porous non-conducting plug of the electrokinetic cell, the dielectric constants and viscosities, the zeta potentials were calculated for various hydrocarbon liquids, and the results set forth below in Table I. The results show a very low zeta potential for depolarized isooctane as expected, since pure hydrocarbons should exhibit no electrokinetic potentials. Thus, it is seen that relatively pure hydrocarbons with very low fouling tendencies exhibit very low or no electrokinetic properties. Likewise, it is seen that the zeta potentials of straight-run stocks are low compared to cracked stocks or mixtures of cracked and straight run stocks. This is generally in keeping with the relative fouling tendencies of these hydrocarbons with the cracked stock having a relatively high fouling tendency, the mixed stock an average or normal fouling tendency, and the straight run a relatively low fouling tendency. Also, this is in keeping with the current thinking that compounds believed to accelerate fouling in heat exchanger tubes, such as organic nitrogen, sulfur, and oxygen compounds, trace metal contaminants and olefins are present in higher concentrations in cracked stock than in straight-run stocks. Some of these compounds, in their ionic form are believed to cause formation of the double layer and thereby induce the electrokinetic properties of the fluids. Other factors such as thermo energy, etc., also influence the fouling of heat exchanger tubes and the presence of contaminants themselves is not believed to be the sole factor involved.

TABLE I.—*Calculated zeta potentials*

| Hydrocarbon | Zeta potential |
|---|---|
| Depolarized isooctane | $-3 \times 10^{-4}$ mv. |
| Straight run naphtha | $+5 \times 10^{-1}$ mv. |
| Straight run naphtha | $+5.7 \times 10^{-2}$ mv. |
| Mix—20% cracked naphtha<br>80% straight run naphtha | $-1.09$ mv. |
| Cracked naphtha | $-11.5$ mv. |

FIG. 6 demonstrates the reproducibility of the method of the invention in using the above described apparatus in carrying out same. Five different samples of cracked naptha were measured for streaming current at various volumetric flow rates. The points from each of the five samples fell essentially on the same line showing a linear relationship between volumetric flow rate and streaming current in relatively low flow rates. At the higher flow rates, say above about 2 cc. per second, the linearity disappears due to the fact that laminar flow is replaced with turbulent flow. The fact that the points obtained from the five samples all fall upon the same curve also proves within experimental error that the method of the invention has good reproducibility. Also it is shown that electrokinetic phenomena is important to the operation of the apparatus, since were this not so the results would be random and poorly reproducible.

FIG. 7 demonstrates that the measurement of streaming current is extremely useful in obtaining a picture of maximum dosage and efficiency of proposed additives. In this experiment, a known anti-fouling additive was added in various dosages to a hydrocarbon fluid comprising 70% straight run and 30% cracked naphtha. The first graph of this figure shows that the maximum effectiveness of this additive when measured by means of the laboratory fouling test apparatus previously described, occurred at a concentration of 25 p.p.m. Likewise the streaming current, $i_s$, also had a maximum at a dosage of 25 p.p.m. of additive, the exact same dosage where maximum reduction in fouling occurred in the laboratory fouling test rig. The same type of correlation is shown with regard to resistance values. While the sign of the charge and influence of the additive on the streaming current varied from fluid to fluid, which were tested in the presence of this additive, similar behavior was noted. Since this particular additive acts primarily as a dispersant with some stabilizing properties, it is believed that a critical zeta potential governs the stabilizing and/or dispersing properties of this additive. Thus, it was shown that the measurement of streaming current, and particularly, its fluctuation was in a direct relation to decrease in effectiveness of the additive as its dosage was increased. In this particular case, the streaming current fell off in magnitude in direct proportion to the decrease in optimum efficiency of the additive.

FIG. 8 shows changes in streaming currents run at 1 cc./sec. of five fuel oil samples. These samples were stored for 13 weeks at 110° F. and readings were obtained on these samples each week. Two samples, namely, No. 1 and No. 2 exhibited much less variation in $i_s$ from week to week than did samples No. 3, 4 and 5. Standard laboratory tests showed that samples No. 1 and No. 2 were relatively stable over the period of testing, while samples No. 3, 4 and 5, were unstable. In fact, the three unstable samples showed drastic changes in streaming current long before indications of measurable gum formation was shown by standard laboratory tests. Again, this illustrates a proportional relationship between electrokinetic behavior and gum formation.

FIG. 9 is a comparison between conductivity changes of three fuel oil samples, as determined with the apparatus of the invention, in relation to laboratory gum measurements of the same samples over the same period of time. The samples Nos. 5, 6 and 7 were stored for 13 weeks at 110° F. and conductivity readings were taken every week as well as total gum determinations. The results point out the direct relationship between conductivity and undesirable gum formation, with the oil having the greatest tendency toward gum formation also exhibiting the highest increase in conductivity.

FIG. 10 shows variations in streaming current with time of samples No. 8, 9 and 10. Sample 8 was an unstable fuel oil. Sample 9 was a stable fuel oil, and sample 10 was treated sample 8 to which had been added 34 p.p.m. of a known stabilizing agent. Both the treated and untreated fuel oil samples were stored for 13 weeks at 110° F., and streaming currents measured every week. The treated sample showed at all times a more negative streaming current than the untreated one. Also, at the end of 13 weeks the treated sample gave a measurable gum of 1.5 mg./l., while the untreated unstable sample gave a measurable gum of 10.7 mg./l. The treated sample showed a relatively stable streaming current, especially in the critical initial weeks of 1 to 6. Likewise, the stable untreated fuel oil sample showed relatively little streaming current fluctuation. On the other hand the untreated unstable sample demonstrated wide variations in streaming current particularly in the initial critical weeks. Thus, it is apparent that the stability of a stored sample in the presence of a stabilizing agent can be directly measured by a measurement of the streaming current. Only minor fluctuations in streaming current demonstrate that the sample is maintaining its requisite stability and forming few conductive gum bodies. Likewise, the indication of effectiveness of the additive may be realized in a much shorter period than the normal testing periods which may extend over a period of three months or more. By measuring the change of electrokinetic behavior in terms of zeta potential, it is possible to determine the amount of gum formation, and simultaneously arrive at a conclusion of additive effectiveness in a much shorter period of time than through prior art methods.

In addition to the above uses of the invention, it is also possible to determine by measurement of streaming current, streaming potential and zeta potential whether an additive work through a mechanism of stabilizing or by interfering with gum formation by reaction chemically or through both mechanims. For example, via dispersion, the primary cause of antifouling effect the additive may act by forming a double layer of charge on already formed colloidal particles, thereby increasing the net electrical potential that would prevent them from agglomerating or aggregating into gum particles and keep them stabilized in the liquid media. While in stabilization, the chemical changes resulting from the presence of the additive, can be detected through the nature and sign of the streaming potential, and with sufficient data can be related to the particular additive. In addition, the method and apparatus of the invention may be suitably applied to the study of emulsification and emulsion breaking with additives, as well as corrosion studies.

It is apparent that many modifications and variations of the invention may be practiced other than those specifically enumerated without departing from the true scope of the invention.

It is hereby claimed as follows:

1. The method of determining the fouling tendencies of petroleum hydrocarbon intermediate distillates which comprises the steps of storing said intermediate distillates for a period of time sufficient to allow electrokinetic changes to occur in said intermediate distillates, measuring the streaming current of said distillates under conditions of laminar flow at intervals during said storage period, and determining the magnitude of fluctuation of the streaming current during the storage period, said magnitude of fluctuation being proportional to the fouling tendencies of said distillates.

2. The method of claim 1 wherein said intermediate distillates are stored from about 72° ±5 to about below the boiling point of said intermediate distillates for at least a period of two weeks.

3. The method of claim 1 wherein said magnitude of fluctuation of streaming current is determined by plotting said streaming current versus storage time.

4. The method of claim 1 wherein said intermediate distillates are stored at temperatures ranging from 95 to 125° F. for a period of time ranging from 10 to 16 weeks.

5. The method of claim 1 wherein said petroleum hydrocarbon intermediate distillates are selected from the group consisting of gas oils and naphthas.

6. The method of determining the efficiency and optimum dosage of antifouling additives used in treatment of petroleum hydrocarbon intermediate distillates which comprises the steps of adding incremental dosages of said additives to aliquot samples of said distillates, storing said distillate samples for a period of time sufficient to allow electrokinetic changes to occur in said samples, measuring the streaming currents of said distillate samples under conditions of laminar flow at intervals during said storage period, and determining the magnitude of fluctuation of streaming current during said storage period, said magnitude of fluctuation being inversely proportional to the effectiveness of said additives.

7. The method of claim 6 wherein said treated distillate samples are stored at temperatures ranging from 72° ±5 to about below the boiling point of said distillates for at least two weeks.

8. The method of claim 6 wherein said magnitude of fluctuation of streaming current is determined by plotting streaming current versus storage time.

9. The method of claim 6 wherein said treated distillate samples are stored at a temperature range of 95–125° F. for times ranging from 10 to 16 weeks.

10. The method of claim 6 wherein said petroleum distillates are selected from the group consisting of gas oils and naphthas.

11. The method of determining the stability of finished petroleum hydrocarbon products against sludge formation and discoloration which comprises the steps of storing said products for a period of time sufficient to allow electrokinetic changes to occur in said products, measuring the streaming current of said products under conditions of laminar flow at intervals during said storage period, determining the magnitude of fluctuation of the streaming current during the storage period, said magnitude of fluctuation being proportional to the tendency toward instability of said products.

12. The method of claim 11 wherein said products are stored at temperatures ranging from 72° ±5 to about below the boiling point of said products for at least two weeks.

13. The method of claim 11 wherein said magnitude of fluctuation of streaming current is determined by plotting streaming current versus storage time.

14. The method of claim 11 wherein said products are stored at a temperature range of 95–125° F. from about 10 to about 16 weeks.

15. The method of claim 11 wherein said products are selected from the group consisting of fuel oils and gasolines.

16. The method of determining the efficiency and optimum dosage of stabilizing additives used in treating petroleum products which comprises the steps of adding incremental dosages of said additives to aliquot samples of said products, storing said samples for a period of time sufficient to allow electrokinetic changes to occur, measuring the streaming current of said samples under conditions of laminar flow at intervals during said storage period, then determining the magnitude of fluctuations of streaming current during said storage period, said magnitude of fluctuation being proportional to the tendency toward instability of said products.

17. The method of claim 16 wherein said treated hydrocarbon products are stored at temperatures ranging from 72° ±5 to about below the boiling point of said product for at least a period of two weeks.

18. The method of claim 16 wherein said magnitude of fluctuation of streaming current is determined by plotting streaming current versus storage time.

19. The method of claim 16 wherein said products are stored at a temperature range of 95–125° F. during a period of from 10 to 16 weeks.

20. The method of claim 16 wherein said products are selected from the group consisting of fuel oils and gasolines.

21. The method of determining the fouling and storage characteristics of petroleum hydrocarbon fluid selected from the group consisting of intermediate petroleum distillates and petroleum products which comprises the steps of obtaining a sample of said petroleum hydrocarbon fluid, depolarizing a portion of said sample, and determining on both polarized and non-polarized portions of said sample the streaming potentials, the pressure drop of said portions flowing through a porous electrically non-conducting plug of an electrokinetic cell, dielectric constants, and viscosities whereby the zeta potentials of both polarized and non-polarized samples may be calculated by the following equation:

$$\zeta = \frac{V_s K \eta}{\epsilon \epsilon_0 \Delta P}$$

where $\zeta$ is zeta potential, $V_s$ is streaming potential, $K$ is the fluid conductivity, $\epsilon$ is the dielectric constant of the hydrocarbon fluid, $\epsilon_0$ is the dielectric constant of vacuum, $\Delta P$ is the pressure drop across the porous non-conducting plug of the electrokinetic cell and $\eta$ is the viscosity of the fluid, and then comparing the differences of said calculated zeta potentials, said differences being an indication of the fouling and storage characteristics of said petroleum hydrocarbon fluids.

22. The method of determining the efficiency and optimum dosage of antifouling and stabilizing additives used in treatment of petroleum hydrocarbon fluids selected from the group consisting of intermediate petroleum distillates and petroleum products which comprises the steps of obtaining a sample of said petroleum hydrocarbon, depolarizing a portion of said sample, and further adding incremental dosages of said additives to other aliquot portions of said hydrocarbon fluid, and then determining the zeta potentials of the treated, untreated and depolarized samples of said hydrocarbon fluid, and then comparing the differences of said zeta potentials, said differences being an indication of the fouling and storage characteristics of said petroleum hydrocarbon fluid.

References Cited by the Examiner
UNITED STATES PATENTS

| | | | |
|---|---|---|---|
| 2,615,940 | 10/1952 | Williams | 73—194 X |
| 2,661,430 | 12/1953 | Hardway. | |
| 2,794,171 | 5/1957 | Terry | 73—194 X |

LOUIS R. PRINCE, *Primary Examiner.*

DAVID SCHONBERG, *Examiner.*

UNITED STATES PATENT OFFICE
CERTIFICATE OF CORRECTION

Patent No. 3,250,117                                                             May 10, 1966

Mahmoud T. Dajani

It is hereby certified that error appears in the above numbered patent requiring correction and that the said Letters Patent should read as corrected below.

Column 10, lines 7 and 8, for that portion of the equation reading $$x \; \frac{d^2x}{dx^2} \; dv \qquad \text{read} \qquad x \; \frac{d^2v}{dx^2} \; dx$$

same column 10, line 20, beginning with "The units" strike out all to and including "=11.5 mv." in line 49, same column 10, and insert the same after "as shown below." in line 20, column 11.

Signed and sealed this 1st day of August 1967.

(SEAL)
Attest:

EDWARD M. FLETCHER, JR.                          EDWARD J. BRENNER
Attesting Officer                                      Commissioner of Patents